United States Patent
Mougin et al.

(10) Patent No.: US 12,116,493 B2
(45) Date of Patent: Oct. 15, 2024

(54) INK ERADICATING FLUID AND KIT CONTAINING IT

(71) Applicants: SOCIÉTÉ BIC, Clichy (FR); UNIVERSITÉ DE HAUTE-ALSACE, Mulhouse (FR); CENTRE NATIONAL DE LA RECHERCHE SCIENTIFIQUE, Paris (FR)

(72) Inventors: Karine Mougin, Valdicu-Lutran (FR); Guillaume Caffier, Montevrain (FR); Feriel Ghellal, Belfort (FR); Arnaud Spangenberg, Flaxlanden (FR); Quentin Bauerlin, Mulhouse (FR)

(73) Assignees: SOCIÉTÉ BIC, Clichy (FR); UNIVERSITÉ DE HAUTE-ALSACE, Mulhouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 18/547,656

(22) PCT Filed: Feb. 24, 2022

(86) PCT No.: PCT/EP2022/054728
§ 371 (c)(1),
(2) Date: Aug. 23, 2023

(87) PCT Pub. No.: WO2022/180190
PCT Pub. Date: Sep. 1, 2022

(65) Prior Publication Data
US 2024/0301225 A1    Sep. 12, 2024

(30) Foreign Application Priority Data
Feb. 25, 2021 (EP) .................... 21305223

(51) Int. Cl.
| | | |
|---|---|---|
| *C09D 11/17* | (2014.01) | |
| *C09D 9/00* | (2006.01) | |
| *C09D 11/20* | (2006.01) | |
| *C09D 11/50* | (2014.01) | |

(52) U.S. Cl.
CPC ............ *C09D 11/17* (2013.01); *C09D 9/00* (2013.01); *C09D 11/20* (2013.01); *C09D 11/50* (2013.01)

(58) Field of Classification Search
CPC .......... C09D 11/17; C09D 9/00; C09D 11/20; C09D 11/50; C09D 11/16; C09D 11/0037
USPC ................. 106/31.32, 31.33, 31.64, 31.6
See application file for complete search history.

(56) References Cited

U.S. PATENT DOCUMENTS

| 5,427,278 A | 6/1995 | Gardner, III |
| 7,612,124 B2 * | 11/2009 | Polk .................... C08F 2/44 |
| | | 523/160 |
| 2005/0150423 A1 | 7/2005 | Godbout |
| 2007/0017413 A1 | 1/2007 | Kwan et al. |
| 2017/0122875 A1 * | 5/2017 | Fondeur ............. B01J 20/12 |

FOREIGN PATENT DOCUMENTS

| EP | 2180022 A1 | 4/2010 |
| EP | 3656825 A1 | 5/2020 |
| EP | 3656826 A1 | 5/2020 |
| WO | 2005035673 A1 | 4/2005 |
| WO | 2020104346 A2 | 5/2020 |
| WO | 2020104367 A1 | 5/2020 |
| WO | 2021038085 A1 | 3/2021 |

OTHER PUBLICATIONS

Search Report and Written Opinion issued in International Application No. PCT/EP2022/054728, mailed on May 30, 2022.

* cited by examiner

*Primary Examiner* — David J Walczak
(74) *Attorney, Agent, or Firm* — Bookoff McAndrews, PLLC

(57) ABSTRACT

A kit comprising a) an aqueous writing ink composition, containing—metal nanoparticles as coloring agent wherein the metal nanoparticles essentially consists of metal and the metal is chosen from silver, gold, aluminum and/or copper and—a dispersing agent, and b) an eradicator fluid containing at least one oxidizing agent. An aqueous eradicator fluid for erasing an aqueous writing ink composition containing metal nanoparticles as the coloring agent, in which the fluid contains an oxidizing agent and—a volatile solvent. A writing instrument containing the eradicator fluid, the use of the eradicator fluid and/or of the kit containing it and a method of correcting errors of a written mark made on a porous substrate.

20 Claims, No Drawings

INK ERADICATING FLUID AND KIT CONTAINING IT

CROSS REFERENCE TO RELATED APPLICATIONS

This is a National Stage Application under 35 U.S.C. § 371 of International Application No. PCT/EP2022/054728, filed Feb. 24, 2022, now published as WO 2022/0180190 A1, which claims benefit to the European Patent Application No. 21305223.6, filed on Feb. 25, 2021.

TECHNICAL FIELD

The present disclosure concerns an ink eradicating fluid, an eradicable ink and kit containing them.

BACKGROUND

Three technologies are used for correcting errors of written marks once applied on porous substrates:
- Ink eradicator system (pH ink) comprising: an eradicable ink (with at least one pH-sensitive dye as coloring agent), an eradicating fluid (pH eraser) and a re-write ink (with at least one non-pH sensitive dye).

One problem associated with this ink eradicator system is that three different writing instruments may be required: one for the eradicating fluid, one for the eradicable ink and one for the re-write ink, which is not suitable for the user. Besides, the consumer can easily confuse the eradicable ink, which should be used for the original marking, and the re-write ink.
- Thermochromic inks (with leuco-dyes as coloring agent) which are erasable by the use of heat generated by the friction of an eraser.

The technical problem with thermochromic inks is that the erasure is reversible with low temperature and therefore the erased draw lines can be regenerated unwantedly.
- Peelable inks (with pigment as coloring agent) which are erasable by the use of an eraser.

The technical problem of peelable inks is the change of the texture of the porous surface after erasing which can draw the reader's attention to the corrected mistake.

Therefore, there is a need to find a new aqueous erasable ink composition having good erasability, specifically while avoiding an unwanted color loss due to a change in temperature and/or unwanted color return. Besides, it may be advantageous to find an improved system whereby only two fluids are required: the eradicating fluid and a single ink which can be corrected using the eradicating fluid and which also can be used to make the corrections, or used instead of a separate re-write ink.

In order to overcome these technical problems, the inventors have surprisingly found that the use of metal nanoparticles as coloring agent in which said metal nanoparticles essentially consists of metal and said metal is chosen from silver, gold, aluminum and/or copper in combination with a dispersing agent, such as homopolymer or copolymer of vinylpyrrolidone and/or homopolymer or copolymer of vinyl alcohol, and mixtures thereof, in a water-based ink composition can be easily erased by an oxidizing agent and then the same ink can be used as the re-write ink. Besides, without being bound by the theory, it seems that the use of dispersing agent, such as polyvinylpyrrolidone and/or polyvinyl alcohol in water-based ink composition comprising metal nanoparticles as coloring agent, offers excellent steric stability and/or helps prevent metal nanoparticles from directly contacting and/or aggregating and/or sedimenting in water-based ink, which lets to obtain more stronger and/or stable plasmon effect. In particular, such agglomeration and/or aggregation and/or sedimentation may prevent the obtaining of a plasmonic effect. Moreover the presence of the dispersing agent may allow the ink to be more easily erased with an oxidizing agent.

U.S. Pat. No. 5,427,278 describes the use of an oxidizing agent for removing transparent or translucent emphasizing inks. However such inks do not contain metal nanoparticles as coloring agent. Moreover only a short list of oxidizing agent could be used as an eradicator such as halogen-containing liquid bleaching solutions; alkali and alkaline-earth salt solutions formed with hypochlorites (bleaches), triazine chlorine, and triazine type derivatives; sodium, lithium and calcium hypochlorite solutions; chlorine triazinetrione solutions, such as sodium or potassium dichloro-s-triazinetrione and trichloro-striazinetrione solutions; sodium, potassium and ammonium persulfate and potassium peroxymonosulfate solutions; and solutions of 1-bromo-3-chloro-5-dimethylhydantoin either alone or in combination with 1,3-dichloro-5,5-dimethylhydantoin. In particular this document mentions that a 3% solution of hydrogen peroxide, a 6% solution of hydrogen peroxide, and a 6% solution of hydrogen peroxide with ammonia added (hair bleaching solution) are not effective and that in addition, tests with various solutions of nitrates of yttrium, strontium, sodium, barium, potassium, cerium, silver, cobalt, ceric ammonium, and lanthanum; as well as tests with potassium perchlorate, dichromate and permanganate proved to be also unsatisfactory. Thus only specific oxidizing agents could be used as eradicator.

EP2180022 discloses an eradicating fluid and eradicable inks. However such inks do not contain metal nanoparticles as coloring agent. Moreover oxidizing agents are cited among a long list of eradicators and no specific example is given.

WO 2020/104367 and WO 2020/104346 disclose aqueous writing ink composition containing metal nanoparticles as coloring agent. However these documents do not disclose the presence of the addition of dispersing agent in the aqueous ink and neither that it is possible to use an eradicator fluid containing an oxidizing agent to erase the written mark.

Therefore there is a need for a kit containing a particular eradicating fluid and a particular eradicable ink, in particular which can be used also as the re-write ink.

SUMMARY

The present disclosure therefore concerns a kit comprising, more specifically consisting of,
a) an aqueous writing ink composition, more specifically an aqueous gel ink, containing:
  metal nanoparticles as coloring agent, more specifically as the only coloring agent, wherein said metal nanoparticles essentially consists of metal and said metal is chosen from silver, gold, aluminum and/or copper, more specifically said metal is silver,
  a dispersing agent, such as homopolymer or copolymer of vinylpyrrolidone and/or homopolymer or copolymer of vinyl alcohol, and mixtures thereof, and
b) an eradicator fluid containing at least one oxidizing agent.

DETAILED DESCRIPTION

Hereinafter, a detailed description of the present disclosure will be given. The specific embodiments are meant to better illustrate the present disclosure, however, it should be understood that the present disclosure is not limited to these specific embodiments.

In the sense of the present disclosure, the expressions "comprising a" and "containing a" should be understood as being synonymous with respectively "comprising at least one" and "containing at least one".

In the sense of the present disclosure, the expressions "between . . . and . . . " or "ranging from . . . to . . . " should be understood as including the values of the limits.

In the sense of the present disclosure, the term "ink" is intended to mean a "writing ink" which is intended to be used in a writing instrument, and in particular in a pen. A writing ink should not be confused with a "printing ink" which is used in printing machines and which does not have the same technical constraints and thus the same specifications. Indeed, a writing ink must not contain solid particles of which the size is greater than the channels of the writing instrument, in order to avoid blocking them, which would inevitably lead to writing being irreversibly stopped. In addition, it must allow an ink flow rate suitable for the writing instrument used, in particular a flow rate of between 100 and 500 mg/200 m of writing, and specifically between 150 and 400 mg/200 m of writing. It must also dry sufficiently rapidly to avoid smudging the writing medium. It must also avoid the problems of migration (bleeding) over time. Thus, the ink according to the present disclosure will be suitable for the writing instrument for which it is intended, in particular for a pen.

In addition, a "writing ink" must not be too fluid, so as to avoid leaks during writing. However, it must be sufficiently fluid to facilitate the flow of the writing action.

In the particular case of the disclosure, the writing ink can be more specifically a "gel ink". In particular, such gel ink corresponds to a thixotropic ink, in particular the viscosity measured at rest (at a shear rate of 1 $s^{-1}$) at 20° C. is different and in particular higher than the viscosity measured with a shear rate of 5,000 $s^{-1}$ at 20° C. using the same rheometer such as a cone-and-plate rheometer for example Malvern KINEXUS with a cone of 60 mm and an angle of 1°. In a particular embodiment, the viscosity of the gel ink measured under these conditions ranges from 1,000 to 7,000 mPa·s, specifically from 2,000 to 5,000 mPa·s, and more specifically from 2,500 to 3,500 mPa·s, with a shear rate of 1 $s^{-1}$, and specifically from 5 to 50 mPa·s, more specifically from 7 to 40 mPa·s, and still more specifically from 10 to 20 mPa·s with a shear rate of 5,000 $s^{-1}$.

In the sense of the present disclosure, the term "metal nanoparticles consisting essentially of metal" is intended to mean that the main component of the nanoparticles is metal and in particular that other ingredients in the metal nanoparticles such as impurities, such as metal oxides (silver oxide, gold oxide, copper oxide, aluminum oxide) are only present in trace amount. More specifically the content of metal is of at least 95%, even more specifically of at least 98% by weight, relative to the total weight of nanoparticles. More specifically the content of impurities is lower than 5%, even more specifically lower than 2%, by weight, relative to the total weight of nanoparticles.

In a specific embodiment, the metal nanoparticles consist only of metal.

More specifically the metal of the metal nanoparticles according to the disclosure comprises, still more specifically consists essentially of, in particular consists in, at least silver, gold and mixture thereof, even still more specifically at least silver. Still more specifically the metal nanoparticles are silver nanoparticles, gold nanoparticles or mixture thereof; even still more specifically the metal nanoparticles are silver nanoparticles.

According to a specific embodiment, the aqueous writing ink composition is essentially free of iron, in particular of iron powder.

More specifically the metal nanoparticles according to the disclosure have an average particle size ranging from 1 to 200 nm, even more specifically from 2 to 100 nm, still more specifically from 5 to 100 nm. More specifically the longest dimension of the metal nanoparticles is ranging from 1 to 200 nm, even more specifically from 2 to 100 nm, still more specifically from 5 to 100 nm. More specifically all the dimensions of the metal nanoparticles are ranging from 1 to 200 nm, even more specifically from 2 to 100 nm, still more specifically from 5 to 100 nm. This average particle size and the dimension of the particles are determined by analysis of 2D images (microscope: JEOL ARM 200), according to the standard ISO9001:2015.

The metal nanoparticles according to the disclosure can have different shapes such as spheres, platelets, rods, wires (in particular pentagonal, Y-shaped, K-shaped and multi-branched wires), bars, faceted near-spherical shapes, prisms, flower shapes, polyhedral shapes, triangular shapes, bipyramidal shapes, truncated triangular shapes, square shapes, rectangular shapes, hexagonal plates, urchins shapes or even irregular shapes, more specifically urchin shapes and/or polyhedral shapes. More advantageously they are not in the shape of spheres.

In a particular embodiment the total amount of metal nanoparticles of the aqueous writing ink composition (a) ranges from 0.01 to 10% by weight, specifically from 0.01 to 5%, more specifically from 0.1 to 5% by weight, relative to the total weight of the aqueous writing ink composition (a).

The metal nanoparticles according to the disclosure have the role of a coloring agent in the aqueous writing ink composition (a).

In a specific embodiment, the aqueous writing ink composition containing metal nanoparticles (a) exhibits a plasmonic effect (also called plasmon effect). Hence, different plasmonic color of the ink composition can be obtained depending on the content of the components used.

In fact, the plasmonic color is due to both the light absorption by metal nanoparticles and/or the spacing between them in the aqueous writing ink composition (a).

Depending on their size, shape and distance, the color of the aqueous writing ink composition (or material they are in) may change, as well as its properties. This is due to the plasmon resonance, often present in the case of metal nanoparticles.

The exposure of the metal nanoparticles to a certain frequency of waves brings the electrons to gather in a certain place, which changes in accordance with the shape and size of the metal nanoparticles. This agglomeration of electrons may produce an anisotropy of the metal nanoparticle, which will then lead to a change of light absorption and scattering, resulting in a specific color.

Plasmon resonance may also be affected by the distance between the metal nanoparticles due to the coupling of said metal nanoparticles. Indeed, closer the metal nanoparticles are, the more they will interact with each other, which will increase their coupling effect also called Plasmon effect.

In the same way, the shape of the metal nanoparticles influences the plasmon resonance.

In particular, such plasmonic effect can be characterized by UV (ultraviolet)-visible-NIR (near infra-red) absorption spectroscopy.

Specifically, the total amount of water in the aqueous writing ink (a) ranges from 50 to 95%, more specifically from 60 to 90%, and still more specifically from 70 to 85%, by weight relative to the total weight of the aqueous ink composition.

The aqueous writing ink (a) contains a dispersing agent (which may also be called stabilizing agent), such as homopolymer or copolymer of vinylpyrrolidone and/or homopolymer or copolymer of vinyl alcohol, and mixtures thereof, more specifically homopolymer and/or copolymer of vinylpyrrolidone, even more specifically polyvinylpyrrolidone (PVP).

More specifically the homo and/or copolymer(s), in particular the homopolymer of vinylpyrrolidone may have a weight-average molecular weight of above 5 kDa, specifically between 15 and 2000 kDa, more specifically between 30 and 500 kDa, even more specifically between 80 and 350 kDa, such as PVP K40.

More specifically the homo and/or copolymer(s), in particular the homopolymer of vinyl alcohol may have a weight-average molecular of above 20 kDa, specifically between 50 and 100 kDa, more specifically between 60 and 80 kDa.

Without being bound by the theory, the dispersing agent may avoid in particular the agglomeration and/or aggregation and/or sedimentation of the metal nanoparticles. Such agglomeration and/or aggregation and/or sedimentation prevents the formation of a plasmonic effect. In particular, such agglomeration and/or aggregation and/or sedimentation may prevent the obtention of a plasmonic effect and therefore such a writing ink will be more difficult to erase with an eradicator fluid containing an oxidizing agent.

More specifically the total amount of dispersing agent is ranging from 0.01 to 10%, more specifically from 0.01 to 5%, still more specifically from 0.1 to 0.4%, by weight relative to the total weight of the aqueous writing ink composition (a).

The aqueous writing ink composition (a) may further contains:
a reducing agent, more specifically chosen from alkali metal salt or alkaline earth metal salt, and/or hydroxylamine ($NH_2OH$) and/or ascorbic acid and/or oxalic acid and/or formic acid and/or formaldehyde and/or hydrazine and/or substituted hydrazine e.g. 1,1-dimethylhydrazine or 1,2-dimethylhydrazine and/or sodium hydrosulfite and/or tributylstannane and/or tributyltin hydride and/or triphenyl-phosphine and/or triphenylphosphite and/or trichlorosilane and/or triethylsilane, tris(trimethylsilyl)silane and/or polymethylhydroxylisane and/or ester of retinol of formula (I):

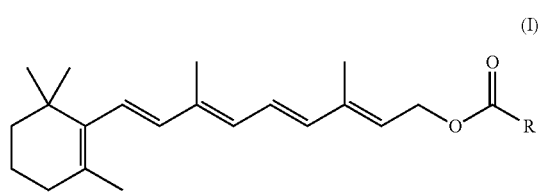

(I)

wherein R is an optionally substituted $C_1$-$C_6$ aliphatic group, more specifically a ($C_1$-$C_6$)alkyl group, and/or citric acid and/or derivatives of citric acid chosen from esters, amides and thioesters of citric acid, salts of citric acid or of said derivatives, solvates of citric acid or of said derivatives, such as hydrates, and mixture thereof and/or an N-Acyl-aminophenol, wherein said hydroxyl group is more specifically in meta or in para position on the benzenic group, more specifically in para position, more specifically an N-Acyl-aminophenol of formula HO—R1-NH—CO—R2 wherein R1 is a benzene ring and R2 is an alkyl group comprising more specifically from 1 to 6 carbon atoms, more specifically from 1 to 3 carbon atoms, more specifically the hydroxyl group is more specifically in meta or in para position, more specifically in para position and/or
alkali metal hydride, specifically sodium borohydride $NaBH_4$.

Specifically in the ester (s) of retinol of formula (I), R represents a $C_1$-$C_6$ aliphatic group, said aliphatic group being optionally substituted with at least one hydroxyl, halogen, amino, $C_1$-$C_8$ alkyl and/or $C_1$-$C_3$ alkoxy group, said aliphatic group being more specifically a $C_1$-$C_6$ alkyl group, still more specifically a $C_1$-$C_4$ alkyl group, in particular a methyl group, more particularly unsubstituted. The ester of retinol represented by the formula (I), wherein R represents a methyl group, is commonly known as retinyl acetate (CAS number: 127-47-9), also known as vitamin A acetate, which may be purchased via Sigma-Aldrich.

Specifically the N-Acyl-aminophenol is N-acetyl-para-aminophenol. According to this specific embodiment, in formula HO—R1-NH—CO—R2, R1 is a benzene ring, R2 is a methyl radical, and the hydroxyl group is in para position. The N-acetyl-para-aminophenol (CAS number: 103-90-2), also known as paracetamol or acetaminophen, may be purchased under different trade name such as Doliprane®, Tylenol®, Calpol®, Panadol®, Dafalgan®, Efferalgan®, etc.

More specifically the reducing agent of the aqueous writing ink composition (a) is chosen from:
alkali metal salt and/or alkaline earth metal salt of citrate and/or of chloride and/or carbonate, more specifically from an alkali citrate salt and/or an alkali chloride salt and/or an alkali carbonate salt, still more specifically from sodium citrate and/or magnesium chloride and/or calcium chloride, even more specifically sodium citrate;
ascorbic acid;
alkali metal hydride, specifically sodium borohydride $NaBH_4$;
and mixture thereof.

More specifically it is a mixture of sodium citrate (in particular trisodium citrate), ascorbic acid and sodium borohydride $NaBH_4$.

In the present disclosure, the alkali metals of citrate may be chosen among lithium citrate, sodium citrate, potassium citrate, rubidium citrate, caesium citrate and francium citrate, specifically sodium citrate or potassium citrate, more specifically sodium citrate.

In the present disclosure, the alkaline earth metal salts of citrate may be chosen among beryllium citrate, magnesium citrate, calcium citrate, strontium citrate, barium citrate and radium citrate, specifically magnesium citrate or calcium citrate, more specifically calcium citrate.

In the present disclosure, the alkali metal or alkaline earth metal carbonate may be chosen among potassium carbonate, sodium carbonate, magnesium carbonate, calcium carbonate, strontium carbonate, barium carbonate, and mixtures thereof, more specifically at least one of magnesium carbonate, calcium carbonate, strontium carbonate and barium carbonate, even more specifically calcium carbonate.

In the present disclosure, the alkali metal hydride may be chosen among sodium borohydride ($NaBH_4$), sodium cyanoborohydride ($NaBH_3CN$), sodium triacetoxy borohydride ($NaHB(OAc)_3$), sodium tri-sec-butylborohydride, potassium tri-sec-butylborohydride, potassium triethylborohydride, lithium triethylborohydride, lithium tri-sec-butylborohydride, nickel borohydride, lithium aluminate hydride, diisobutylaluminium hydride, sodium bis (2-methoxyethoxyaluminium hydride, specifically it is sodium borohydride ($NaBH_4$).

In particular, when present, the total amount of alkali metal salt of the aqueous writing ink composition (a) is of at least 0.001 weight %, in particular ranges from 0.01 to 0.05 weight %, based on the total weight of the aqueous writing ink composition (a).

In particular, when present, the amount of alkali metal hydride of the aqueous writing ink composition (a) is of at least 0.0000001 weight %, more specifically ranges from 0.0000001 to 0.00007 weight %, based on the total weight of the aqueous writing ink composition (a).

In the present disclosure the derivatives of citric acid are chosen from esters, amides and thioesters of citric acid, salts of citric acid or of said derivatives, solvates of citric acid or of said derivatives, such as hydrates, and mixtures thereof. The suppliers of citric acid and/or derivatives are chosen among: Fluka™, Sigma-Aldrich™, TCI Chemicals™.

The esters of citric acid are specifically alkyl esters, more specifically C1-30 alkyl esters, more specifically C1-20 alkyl esters, more specifically C1-6 alkyl esters. The esters of citric acid can be monoesters, diesters and/or triesters, more specifically triesters of citric acid. The esters of citric acid used in the present disclosure include isodecyl citrate, isopropyl citrate, stearyl citrate, dilauryl citrate, distearyl citrate, tributyl citrate, tricaprylyl citrate, triethyl citrate, triethylhexyl citrate, trihexyldecyle citrate, triisocetyl citrate, trilauryl citrate, trioctyldodecyl citrate, trioleyl citrate, triisostearyl citrate, tristearyl citrates, ethyl citrates, tri-$C_{12-15}$-alkyl citrate such as tributyl citrate or triethyl citrate, tricaprylyl citrate, triethylhexyl citrate, triisocetyl citrate, trioctyldodecyl citrate, triisostearyl citrate, isodecyl citrate, stearyl citrate, dilauryl citrate, and ethyl citrate. More specifically, the esters of citric acid of the present disclosure are tributyl citrate and triethyl citrate.

The amides of citric acid used in the present invention may be prepared by the reaction of primary amines with citric acid. The amination reaction to form the amide may be performed using a variety of conditions well known in the organic chemical art as described in the Kirk-Othmer Encyclopedia of Chemical Technology, 4th Ed., Vol. 2, p. 348-351. The preferred method involves the reaction of citric acid with 3 or more equivalents in a protic solvent. All primary amines or mixtures of primary amines containing more specifically the requisite C1 to C18 alkyl substituents may be utilized for the preparation of the tri-alkylcitramides of this disclosure. The alkyl groups in the citramides may be the same or different and may be linear or branched. Examples of suitable alkyl groups are methyl, ethyl, n-propyl, isopropyl, n-butyl, iso-butyl, sec-butyl, n-pentyl, 2-pentyl, 3-pentyl, iso-pentyl, neopentyl, cyclopentyl, 2-methylbutyl, 3-methyl-2-butyl, n-hexyl, 2-hexyl, 3-hexyl, cyclohexyl, 2-ethylbutyl, 4-methyl-2-pentyl, n-heptyl, n-octyl, n-2-ethylhexyl, n-nonyl, n-decyl, n-undecyl, n-dodecyl. Specifically, the amides of citric acid of the present disclosure are tri-butyl citramide and triethyl citramide.

The thioesters of citric acid used in the present disclosure may be prepared by the reaction of thiol and derivatives with citric acid. Several examples of thiols and derivatives can be used: allyl mercaptan, 2-aminoethanethiol, 2-aminobenzenethiol, 3-aminobenzenethiol, 4-aminobenzenethiol, 1,3-benzenedimethanethiol, 1,4-benzenedimethanethiol. Specifically, the thioester of citric acid is obtained by reaction between an allyl mercaptan and citric acid.

The salts of citric acid, also known as citrate salts, may come with various levels (mono-, di-, tri-) of different metal cations such calcium, potassium or sodium. Citric acid exists in greater than trace amounts in a variety of fruits and vegetables, most notably citrus fruits. The citrate salts are all produced by chemical reaction with citric acid and the hydroxide or carbonate of the respective salt.

The salts of citric acid used in the present disclosure include aluminium citrate, calcium citrate, copper citrate, diammonium citrate, disodium citrate, cupric citrate, ferric citrate, magnesium citrate, manganese citrate, monosodium citrate, potassium citrate, sodium citrate, zinc citrate. Specifically, the salts of citric acid of the present disclosure are sodium citrate, potassium citrate, and diammonium citrate.

The solvates of citric acid or of said derivatives in the present invention are chosen among citric acid monohydrate, citric acid trisodium salt dihydrate, citric acid disodium salt sesquihydrate. Specifically, the solvate of citric acid of the present invention is citric acid monohydrate.

In a specific embodiment, the amount of reducing agent in the aqueous writing ink composition (a) ranges from 0.0000001% to 0.5%, by weight relative to the total weight of the aqueous writing ink composition (a).

In a specific embodiment the aqueous writing ink composition (a) contains sodium citrate, specifically in a total amount ranging from 0.001 to 0.1%, more specifically from 0.01 to 0.05%, by weight relative to the total weight of the aqueous writing ink composition (a).

In a specific embodiment the aqueous writing ink composition (a) contains ascorbic acid, specifically in a total amount ranging from 0.0005 to 0.5%, more specifically from 0.001 to 0.1%, and even more specifically from 0.005 to 0.05%, by weight relative to the total weight of the aqueous writing ink composition (a).

In a specific embodiment the aqueous writing ink composition (a) contains sodium borohydride, specifically in a total amount of at least 0.0000001 weight %, more specifically ranges from 0.0000001 to 0.00007, by weight relative to the total weight of the aqueous writing ink composition (a).

The aqueous writing ink (a) may also comprise classic ink ingredients, in particular classic gel ink ingredients such as co-solvents, antimicrobial agents, corrosion inhibitors, antifoam agents, rheology modifiers, as described below.

The aqueous writing ink (a) may thus comprise a co-solvent. Among the co-solvents that can be used, mention may be made of polar solvents miscible in water such as:
 glycol ethers such as triethylene glycol, polyethylene glycol, diethylene glycol monoethyl ether, diethyleneglycol-mono butyl ether, dipropyleneglycol monobutyl ether, tripropylene glycol monomethyl etherphenoxyethanol, phenoxypropanol,
 alcohols: linear or branched alcohol in $C_1$-$C_{15}$ such as benzyl alcohol, glycerin, diglycerin, polyglycerin,
 esters such as ethyl acetate or propyl acetate,
 carbonate esters such as propylene carbonate or ethylene carbonate,
 mixtures thereof.

In a specific embodiment, the co-solvent is chosen in the group consisting of glycol ethers, and more specifically is chosen in the group consisting of triethylene glycol, polyethylene glycol, diethylene glycol monoethyl ether, diethylene-glycol-mono butyl ether, dipropyleneglycol monobutyl ether, tripropylene glycol monomethyl ether, phenoxyethanol, phenoxypropanol, and mixture thereof. In a further specific embodiment the co-solvent is chosen in the group consisting of triethylene glycol, polyethylene glycol and mixture thereof.

Specifically, the total amount of the co-solvent in the aqueous writing ink (a) ranges from 5 to 35%, more specifically from 9 to 30%, even more specifically from 11 to 25%, by weight relative to the total weight of the aqueous writing ink (a).

The aqueous writing ink (a) may comprise an antimicrobial agent such as isothiazolinone (ACTICIDE® from Thor), specifically chosen in the group consisting of 1,2-benzisothiazolin-3-one, 2-methyl-4-isothiazolin-3-one, and mixture thereof.

Specifically, the total amount of the antimicrobial agent in the aqueous writing ink (a) ranges from 0.01 to 0.5%, more specifically from 0.1 to 0.2%, by weight relative to the total weight of the aqueous writing ink (a).

The aqueous writing ink (a) may comprise a corrosion inhibitor, specifically chosen in the group consisting of tolytriazole, benzotriazole, and mixture thereof.

Specifically, the total amount of the corrosion inhibitor in the aqueous writing ink (a) ranges from 0.05 to 1%, more specifically from 0.07 to 0.6%, even more specifically from 0.08 to 0.4%, by weight relative to the total weight of the aqueous writing ink (a).

The aqueous writing ink (a) may comprise an antifoam agent, specifically a polysiloxane-based antifoam agent, and more specifically an aqueous emulsion of modified polysiloxane (such as MOUSSEX® from Synthron, TEGO® Foamex from Evonik).

Specifically, the total amount of the antifoam agent in the aqueous writing ink (a) ranges from 0.05 to 1%, more specifically from 0.1 to 0.5%, even more specifically from 0.2 to 0.4%, by weight relative to the total weight of the aqueous writing ink (a).

The aqueous writing ink (a) may comprise a rheology modifier capable of generating a gelling effect, in particular capable of generating a thixotropic phenomenon wherein the viscosity depends on the time of shear rate, for example chosen in the group consisting of polysaccharides such as xanthan gum, gum arabic, and mixture thereof.

Specifically, the total amount of the rheology modifier in the aqueous writing ink (a) ranges from 0.08 to 2%, more specifically from 0.2 to 0.8%, even more specifically from 0.3 to 0.6%, by weight relative to the total weight of the aqueous writing ink (a).

The aqueous writing ink (a) may also comprise other additives such as:
  pH regulators like sodium hydroxide and triethanolamine,
  lubricants,
  coalescing agents,
  crosslinking agents,
  wetting agents,
  plasticizers,
  antioxidants, and
  UV stabilizers.

In a specific embodiment, the aqueous writing ink (a) according to the disclosure does not contain any other coloring agent than the metal nanoparticles. Therefore it does not contain any dyes or pigments. In this case, the color of the aqueous writing ink (a) is due only to the metal nanoparticles and the ink is an erasable aqueous writing ink.

For the purposes of the present disclosure, the term "erasable ink" is intended to mean any ink which can be erased after writing by the use of the eradicator fluid (b) according to the disclosure. The written mark obtained, in particular on the porous support, by this ink can therefore be erased any time after writing by the use of the eradicator fluid (b) according to the disclosure.

Specifically, the ink is an irreversible erasable aqueous writing ink. It is not possible for the color of the ink to reappear after being erased.

In another specific embodiment, the aqueous writing ink (a) according to the disclosure contains a further coloring agent, other than the metal nanoparticles. In this case the aqueous ink composition is a color changing ink.

For the purposes of the present disclosure, the term "color changing ink" is intended to mean any ink the color of which (first or initial color) can be changed after writing to another color (second color), which is advantageously different from the first color, by the use of the eradicator fluid (b) according to the disclosure. The color of the written mark obtained, in particular on the porous support, by this ink can therefore be changed to another color any time after writing by the use of the eradicator fluid (b) according to the disclosure.

Specifically, the ink is an irreversible color changing aqueous writing ink. Once the color has changed, it is not possible to change it again, and in particular it is not possible to go back to the initial color (first color).

In particular the further coloring agent can be a dye, a pigment or mixture thereof, in particular a dye.

The dye or pigment can be any dye or pigment known by the one skilled in the art and which can be used in aqueous writing inks, specifically in aqueous writing gel ink. Specifically the total amount of the further coloring agent in the aqueous writing ink (a) ranges from 0.01 to 30 weight %, more specifically from 0.05 to 25 weight % based on the total weight of the aqueous writing ink (a).

In a specific embodiment the coloring agent is a dye.

The term "dyes" should be understood as meaning colored, mineral or organic particles of any form, which are soluble in the medium in which they are solubilized, i.e. the aqueous medium of the aqueous writing ink (a), and which are intended to color the ink composition once applied on a porous substrate after the ink has been erased by the eradicator fluid (b). The presence of a dye in the aqueous writing ink composition (a) allows a change of the initial color of the writing in another color by erasure with the eradicator fluid (b). Advantageously, the dye is not a thermochromic dye or a photochromic dye or a pressure sensitive dye.

The aqueous writing ink composition (a) according to the disclosure thus comprises at least one dye. It may also comprise several dyes. The dye may be chosen for example in the group consisting of direct dyes (for example C.I direct black 17, 19, 22, 32, 38, 51, 71; C.I direct yellow 4, 26, 44, 50; C.I direct red 1, 4, 23, 31, 37, 39, 75, 80, 81, 83, 225, 226, 227; C.I direct blue 1, 15, 41, 71, 86, 87, 106, 108, 199, and the like), acid dyes (for example C.I acid black 1, 2, 24, 26, 31, 52, 107, 109, 110, 119, 154; C.I acid yellow 1, 7, 17, 19, 23, 25, 29, 38, 42, 49, 61, 72, 78, 110, 127, 135, 141, 142; C.I acid red 8, 9, 14, 18, 26, 27, 33, 35, 37, 51, 52, 57, 82, 83, 87, 92, 94, 111, 129, 131, 138, 186, 249, 254, 265, 276; C.I acid violet 15, 17, 49; C.I acid blue 1, 3, 7, 9, 15, 22, 23, 25, 40, 41, 43, 62, 78, 83, 90, 93, 100, 103, 104, 112, 113, 158; C.I acid green 3, 9, 16, 25, 27; C.I acid orange 56, and the like), food dyes (such as C.I. food yellow 3, and the like), Malachite green (C.I 4200) Victoria blue FB (C.I. 44045) methyl violet FN (C.I. 42535), rhodamine F4G (C.I. 45160), and rhodamine 6GCP (C.I 45160), and mixtures thereof.

When present, the total amount of the dye(s) in the aqueous writing ink (a) may range from 0.01 to 30% by weight, advantageously from 0.05 to 25% by weight, and more advantageously from 0.3 to 10% by weight, by weight relative to the total weight of the aqueous writing ink composition (a).

In another specific embodiment the coloring agent is a pigment.

The term "pigment" should be understood as meaning white or colored, mineral or organic particles of any form with the exception of metal nanoparticle, which are insoluble in the medium in which they are solubilized, i.e. the aqueous medium of the aqueous writing ink composition (a), and which are intended to color the ink composition once applied on a porous substrate after the ink has been erased by the eradicator fluid (b). Thus the pigment may for example be an inorganic pigment such as a carbon black, ultramarine and titanium dioxide pigment, an organic pigment such as an azo-based pigment, phthalocyanine-based pigment, indigo pigment, thioindigo pigment, thren pigment, quinacridone-based pigment, anthraquinone-based pigment, thron-based pigment, diketopyrrolopyrrole-based pigment, dioxazine-based pigment, perylene-based pigment, perinone-based pigment and isoindolinone-based pigment, a fluorescent pigment, light-storing pigment, a pearlescent pigment, synthetic mica, glass flake, alumina and transparent film with a metal oxide such as titanium oxide, and the like. The pigments are also generally contained in a dispersion, where the grinding down or particle size reduction is accompanied by appropriate dispersants to achieve stable dispersions. The pigment is specifically a pigment dispersion, more specifically chosen in the group consisting of pigment black 7 (such as Flexiverse III black 7 by SunChemical®), pigment blue 15:3 (such as APE FRE BL 15:3 DISP by SunChemical®), pigment red (such as Pigment red 210 by SunChemical®), pigment green 7 (such as Sunsperse Eco green, Flexiverse FD Green, Flexiverse Green 7, Flexiverse HC GRN 7 by SunChemical®), pigment violet 23 (such as Cellusperse® A Violet 4 BP by SunChemical®), pigment yellow 74 (such as FG Yellow 1SL by SunChemical®) and mixtures thereof. In a specific embodiment, the pigment is chosen in the group consisting of pigment black 7 (such as Flexiverse III black 7 by SunChemical®), pigment blue 15:3 (such as APE FRE BL 15:3 DISP by SunChemical®), and mixtures thereof.

According to a specific embodiment, the diameter of the pigment in the pigment dispersion is less than 1 µm, and more specifically less than 0.7 µm.

Specifically, the total amount of the pigment dispersion in the aqueous writing ink (a) ranges from 0.1 to 30% by weight, more specifically from 0.05 to 25% by weight, still more specifically from 0.3 to 10% by weight, relative to the total weight of the aqueous writing ink composition (a).

Specifically, the total amount of the pigment in the pigment dispersion ranges from 10 to 50% by weight, more specifically from 30 to 50% by weight, still more specifically from 35 to 45% by weight, and even still more specifically from 38 to 45%, relative to the total weight of the pigment dispersion.

In a specific embodiment the aqueous writing ink (a) has a fixed color.

In the sense of the invention, the term "fixed color" is intended to mean that the color of the aqueous writing ink (a) by visual observation is the same before application on absorbing support, and after application on absorbing support, specifically paper, cardboard or textiles, within 7 calendar days (one week) and therefore before the use of the eradicator fluid (b). In another specific embodiment the aqueous writing ink (a) does not have a variable color.

In the sense of the disclosure, the term "variable color" is intended to mean that the color of the aqueous writing ink (a) by visual observation is not the same before application on absorbing support, and after application on absorbing support, specifically paper, cardboard or textiles, before the use of the eradicator fluid (b).

For the purposes of the present disclosure, the term "porous substrate" is intended to mean substrate that contains pores. The porous substrates have empty spaces or pores that allow external matter, like ink, to penetrate into the substrate.

In particular, the porous substrate is chosen among porous substrate comprising cellulosic fibers such as paper, printer paper, or cardboard.

The metal nanoparticles according to the disclosure can be prepared ex-situ during the preparation of the aqueous writing ink composition (a) in the form of an aqueous suspension which will be added to the rest of the ink ingredients.

Metal nanoparticles according to the disclosure are in general prepared by reduction of metal salts with a reducing agent, specifically two reducing agents, more specifically three reducing agents, in particular a strong reducing agent, specifically as described above such as a mixture of alkali metal or alkaline earth metal salt of citrate, specifically an alkali citrate salt, even more specifically sodium citrate, an alkali metal hydride, specifically $NaBH_4$, and ascorbic acid, in order to control the growth of the nanoparticles and therefore its size and shape, and in presence of a dispersing agent such as homopolymer or copolymer of vinylpyrrolidone and/or homopolymer or copolymer of vinyl alcohol, even still more specifically as described above such as polyvinylpyrrolidone.

In a specific embodiment, the process of preparation of the aqueous suspension containing metal nanoparticles according to the disclosure comprises the step of:
i. Preparing an aqueous suspension of the seeds of the metal nanoparticles;
ii. Carrying out the growth of the metal nanoparticles;
iii. Optionally a concentration step of the metal nanoparticles in particular by centrifugation and/or evaporation under vacuum and/or tangential flow nanofiltration of the aqueous suspension obtained in step (ii).

Step (i) is in particular carried out by mixing a metal salt (silver, gold, aluminum and/or copper salt, specifically silver and/or gold salts, more specifically silver salts) with water and a reducing agent, specifically two reducing agents, in particular as described above, in particular a mixture of alkali metal or alkaline earth metal salt of citrate, specifically an alkali citrate salt, more specifically sodium citrate such as trisodium citrate, and an alkali metal hydride, specifically $NaBH_4$, still more specifically a mixture of sodium citrate and $NaBH_4$.

In a specific embodiment, the total amount of the metal salt (silver, gold, aluminum and/or copper salt, specifically silver and/or gold salts, more specifically silver salts) added in the aqueous suspension ranges from 0.0005 to 0.05% by weight, more specifically from 0.001 to 0.01% by weight, relative to the total weight of the aqueous suspension of the seeds of the metal nanoparticles.

In a specific embodiment, the total amount of the alkali metal or alkaline earth metal salt of citrate, specifically an alkali citrate salt, more specifically sodium citrate such as trisodium citrate, in the aqueous suspension ranges from 0.0005 to 0.05% by weight, more specifically from 0.001 to 0.01% by weight, relative to the total weight of the aqueous suspension of the seeds of the metal nanoparticles.

In a specific embodiment, the total amount of the alkali metal hydride, specifically $NaBH_4$, in the aqueous suspension ranges from 0.0001 to 0.01% by weight, more specifically from 0.0005 to 0.005% by weight, relative to the total weight of the aqueous suspension of the seeds of the metal nanoparticles.

Step (i) lets to obtain an aqueous suspension of the seeds of the metal nanoparticles, also called "nuclei", more specifically with a size lower than 10 nanometers.

The aqueous suspension of the seeds of the metal nanoparticles obtained in step (i) can be aged for example for 2 hours before its use in step (ii).

Step (ii) can be carried out by mixing the aqueous suspension of the seeds of the metal nanoparticles with:
- a dispersing agent, such as homopolymer or copolymer of vinylpyrrolidone and/or homopolymer or copolymer of vinyl alcohol, more specifically polyvinylpyrrolidone.
- At least one reducing agent, more specifically two reducing agents, in particular such as described above, in particular a mixture of alkali metal or alkaline earth metal salt of citrate, specifically an alkali citrate salt, more specifically sodium citrate such as trisodium citrate, and a further reducing agent, more specifically ascorbic acid, still more specifically a mixture of sodium citrate and ascorbic acid and
- a metal salt from the same metal than the metal salt used in step i).

In one embodiment, the gold salt is $HAuCl_4$, optionally in the form of the trihydrate.

In one embodiment, the silver salt is at least one of $AgNO_3$, $AgClO_4$, $Ag_2SO_4$, $AgCl$, $AgBr$, $AgOH$, $Ag_2O$, $AgBF_4$, $AgIO_3$ and $AgPF_6$, more specifically the silver salt is $AgNO_3$, in particular an aqueous solution of $AgNO_3$. In particular the silver salts are in the form of a solution of silver nitrate in water.

In one embodiment, the aluminum salt is at least one of $AlCl_3$, $Al(NO_3)_3$, $Al_2(SO_4)_3$, more specifically the aluminum salt is $AlCl_3$.

In one embodiment, the copper salt is at least one of $Cu(SO_4)$, $CuCl_2$, $Cu(NO_3)_2$, $Cu(CO_3)$, more specifically the copper salt is $CuCl_2$.

In one embodiment, the total amount of metal salt (silver, gold, aluminum and/or copper salt, specifically silver and/or gold salts, more specifically silver salts) added in the aqueous suspension ranges from 0.0005 to 0.05%, specifically from 0.001 to 0.01% by weight based on the total weight of the aqueous suspension.

In another embodiment, the total amount of the alkali metal or alkaline earth metal salt of citrate, specifically of alkali citrate salt, more specifically of sodium citrate such as trisodium citrate added in the aqueous suspension ranges from 0.001 to 0.1 weight %, specifically from 0.005 to 0.05 weight %, by weight based on the total weight of the aqueous suspension.

In a specific embodiment, the total amount of the ascorbic acid, added in the aqueous suspension ranges from 0.0001 to 0.1 weight %, specifically from 0.0005 to 0.05 weight %, based on the total weight of the aqueous suspension.

In a specific embodiment, the total amount of polyvinylpyrrolidone added in the aqueous suspension ranges from 0.01 to 2 weight %, specifically from 0.05 to 1 weight %, based on the total weight of the aqueous suspension.

The aqueous suspension of metal nanoparticles obtained has a fixed color.

In a specific embodiment, the total amount of metal nanoparticles in the aqueous suspension ranges from 0.0001 to 0.02 weight %, specifically from 0.0005 to 0.01 weight %, based on the total weight of the aqueous suspension.

Its color may vary depending on the type of metal nanoparticles (gold, silver, aluminum or copper) and its amount and the amount of reducing agent used. Its color may in particular depend on the proportion of the alkali metal or alkaline earth metal salt of citrate, specifically of alkali citrate salt, more specifically sodium citrate such as trisodium citrate and/or on the amount of metal salts. For example, the color of the aqueous ink suspension can change from yellow to red to blue with higher amount of the alkali metal or alkaline earth metal salt of citrate, specifically of alkali citrate salt, more specifically of sodium citrate such as trisodium citrate and/or with higher amount of silver salts if the metal salt is silver.

The process of the disclosure can be performed over a wide range of temperature. In general, the process is performed within the temperature range of 0 to 100° C., specifically 5 to 70° C., and more specifically 10 to 40° C. The relatively low process temperatures contribute to process efficiency and process economy, and additionally meet the current ecological demands. Indeed, the process of the disclosure is performed in aqueous media, and is therefore a "green process". In addition, lower temperatures have the advantage that more stable dispersions are obtained and the silver nanoparticles exhibit lower size. Without being bound by the theory, the use of dispersing agent, such as polyvinylpyrrolidone and/or polyvinyl alcohol, may help preventing metal nanoparticles from directly contacting and/or aggregating and/or sedimenting in suspension.

More specifically said method of preparation comprises a concentration step (iii). More specifically, step (iii) is carried out by centrifugation and/or evaporation under vacuum and/or tangential flow nanofiltration of aqueous suspension containing metal nanoparticles obtained in step (ii) in order to concentrate metal nanoparticles into suspension. A concentrated aqueous suspension of metal nanoparticles is thus obtained.

In a specific embodiment, the aqueous suspension containing metal nanoparticles can be centrifuged, for example at 10000 rpm for 30 minutes.

In a specific embodiment, the total amount of metal nanoparticles in the aqueous suspension after concentration ranges from 0.01 to 10 weight %, specifically from 0.05 to 5 weight %, based on the total weight of the aqueous suspension after concentration.

The aqueous writing ink (a) can then be prepared by incorporation or by redispersion of the concentrated suspension obtained in step (iii) or of the aqueous suspension obtained in step (ii) into an aqueous writing ink composition which may also comprise classic aqueous writing ink ingredients, in particular classic aqueous gel ink ingredients such as co-solvents, antimicrobial agents, corrosion inhibitors, antifoam agents, rheology modifiers, as described above.

In a specific embodiment, the total amount of metal nanoparticles in the aqueous writing ink composition ranges from 0.01 to 10 weight %, specifically from 0.1 to 5 weight %, based on the total weight of the aqueous writing ink composition.

The kit according to the present disclosure also contains an eradicator fluid (b) containing at least one oxidizing agent, more specifically an aqueous eradicator fluid.

In particular the oxidizing agent of the eradicator fluid (b) are degradable in contact with light and/or the air, more specifically chosen in the group consisting of oxygen, such as oxygen $O_2$ and ozone $O_3$, hydrogen peroxide $H_2O_2$ and compounds capable of producing hydrogen peroxide by hydrolysis such as nitric acid, organic peroxide such as organic peroxide of methylethylcetone, urea peroxide, alkali metal bromates and persalts such as perborates and persulfates, halogen such as fluorine $F_2$ and chlorine $Cl_2$, oxide such as a permanganate, specifically a permanganate salt, more specifically potassium permanganate $KMnO_4$, and mixtures thereof, more particularly it is hydrogen peroxide $H_2O_2$ and/or a bicarbonate solution.

More specifically the oxidizing agent suitable to be used in the eradicator fluid (b) according to the disclosure has an oxidation-reduction potential superior to the oxidation-reduction potential of the metal(s) of the nanoparticles of the writing ink composition (a), more specifically superior to the oxidation-reduction potential of gold and/or silver and/or copper and/or aluminum, still more specifically superior to the oxidation-reduction potential of gold and/or silver, even still more specifically superior to the oxidation-reduction potential of silver (in particular the oxidation-reduction potential of gold, silver, copper and aluminum are as follow:

E $(Au^{3+}/Au)$=1.52 V
E $(Ag^+/Ag)$=0.80 V
E $(Cu^{2+}/Cu)$=0.34 V
E $(Al^{3+}/Al)$=−1.66 V)).

In a specific embodiment, the total amount of the oxidizing agent in the eradicator fluid (b) ranges from 10 to 60 weight %, specifically from 20 to 40 weight %, based on the total weight of the eradicator fluid (b).

In a specific embodiment the eradicator fluid is an aqueous fluid.

More specifically, the total amount of water in the eradicator fluid (b) ranges from 40 to 90 weight %, specifically from 60 to 80 weight %, based on the total weight of the eradicator fluid (b).

The eradicator fluid (b) can further contain a volatile solvent in particular a water soluble solvent such as ethanol, acetone, N,N-Dimethylformamide (DMF) and acetonitrile, more specifically chosen from ethanol and/or N,N-Dimethylformamide, even more specifically ethanol. This solvent allows the eradicator fluid to dry more easily. More specifically, the total amount of volatile solvent in the eradicator fluid (b) ranges from 5 to 30 weight %, specifically from 10 to 20 weight %, based on the total weight of the eradicator fluid (b).

The eradicator fluid (b) may also contain other additives such as antimicrobial agents agent, such as isothiazolinone (ACTICIDE® from Thor), specifically chosen in the group consisting of 1,2-benzisothiazolin-3-one, 2-methyl-4-isothiazolin-3-one, and mixtures thereof, and/or co-solvent(s).

The eradicator fluid (b) can be prepared by method well known by the one skilled in the art such as simple mixing of the oxidizing agent with water and the optional volatile solvent and optional additives.

In a specific embodiment, the aqueous writing ink composition (a) and the eradicator fluid (b) are contained in two different writing instruments.

In particular each writing instrument comprises:
an axial barrel containing the aqueous writing ink composition (a) or the eradicator fluid (b), and
a pen body which delivers the aqueous writing ink composition (a) or the eradicator fluid (b) stored in the axial barrel.

The writing instrument of the aqueous writing ink composition (a) may be chosen in the group consisting of gel pens, felt pens, markers, and specifically gel pens.

The writing instrument of the eradicator fluid (b) may be chosen in the group consisting of felt pens, correction fluid, markers, and specifically felt pens.

In another specific embodiment, the aqueous writing ink composition (a) and the eradicator fluid (b) are contained in the same writing instrument.

Specifically said writing instrument contains at least two separate reservoirs, more specifically two applicators tips opposite to each other (in particular at the opposite end of the writing instrument). The applicator tip for the aqueous writing ink composition (a) can be of the gel type, felt type or marker type, specifically of the gel type.

The applicator tip for the eradicator fluid (b) can be of the gel type, felt type, correction fluid type, marker type, specifically of the felt type.

The present disclosure also concerns an aqueous eradicator fluid for erasing an aqueous writing ink composition containing metal nanoparticles as the coloring agent, specifically as the only coloring agent, in which said metal nanoparticles essentially consists of metal and said metal is chosen from silver, gold, aluminum and/or copper, said fluid containing:
at least one oxidizing agent, specifically chosen in the group consisting of hydrogen peroxide $H_2O_2$, oxygen, such as oxygen $O_2$ and ozone $O_3$, compounds capable of producing hydrogen peroxide by hydrolysis such as nitric acid, organic peroxide such as organic peroxide of methylethylcetone, urea peroxide, alkali metal bromates and persalts such as perborates and persulfates, halogen such as fluorine $F_2$ and chlorine $Cl_2$, oxide such as a permanganate, more specifically a permanganate salt, more specifically potassium permanganate $KMnO_4$, and mixtures thereof, more specifically chosen in the group consisting of hydrogen peroxide $H_2O_2$, oxygen, such as oxygen $O_2$ and ozone $O_3$, compounds capable of producing hydrogen peroxide by hydrolysis selected among nitric acid, organic peroxide, urea peroxide, alkali metal bromates and perborates, permanganate, specifically a permanganate salt, more specifically potassium permanganate $KMnO_4$, and mixtures thereof, more specifically the oxidizing agent is hydrogen peroxide $H_2O_2$, and
a volatile solvent such as ethanol, acetone, N,N-Dimethylformamide (DMF) and acetonitrile and mixtures thereof, more specifically chosen from ethanol and/or N,N-Dimethylformamide, even more specifically ethanol.

In particular, the volatile solvent is a water soluble solvent, more specifically chosen from ethanol, acetone, N,N-Dimethylformamide and acetonitrile and mixtures thereof.

In a specific embodiment, the total amount of volatile solvent in the aqueous eradicator fluid ranges from 5 to 30 weight %, specifically from 10 to 20 weight %, based on the total weight of the eradicator fluid.

In a specific embodiment, the total amount of the oxidizing agent in the aqueous eradicator fluid ranges from 10 to 60 weight %, specifically from 20 to 40 weight %, based on the total weight of the eradicator fluid.

In a specific embodiment the eradicator fluid is an aqueous fluid.

More specifically, the total amount of water in the aqueous eradicator fluid ranges from 40 to 90 weight %, specifically from 60 to 80 weight %, based on the total weight of the eradicator fluid.

In a specific embodiment the aqueous eradicator fluid does not contain a coloring agent.

In particular the eradicator fluid is as described above for the kit can be prepared as described above.

The present disclosure further concerns a writing instrument containing the eradicator fluid according to the disclosure, specifically said writing instrument comprising:
- an axial barrel containing the eradicator fluid according to the disclosure, and
- a pen body which delivers the eradicator fluid according to the disclosure stored in the axial barrel,
- more specifically said writing instrument is chosen in the group consisting of felt pens, correction fluid, markers, and still more specifically felt pens.

The present disclosure also concerns the use of the eradicator fluid containing at least one oxidizing agent according to the invention or contained in the kit according to the disclosure for:
- erasing an aqueous writing ink composition containing metal nanoparticles as the only coloring agent said metal nanoparticles essentially consisting of metal and said metal being chosen from silver, gold, aluminum and/or copper, specifically said aqueous writing ink composition being as described above or contained in the kit according to the disclosure, or
- changing the color of an aqueous writing ink composition containing metal nanoparticles together with a further coloring agent, said metal nanoparticles essentially consisting of metal and said metal being chosen from silver, gold, aluminum and/or copper, the aqueous writing ink composition being specifically as described above or contained in the kit according to the disclosure.

The present disclosure further concerns a method of correcting errors of a written mark made on porous substrate by an aqueous writing ink composition containing metal nanoparticles as the only coloring agent, said metal nanoparticles essentially consisting of metal and said metal being chosen from silver, gold, aluminum and/or copper, the aqueous writing ink composition being specifically as described above or contained in the kit according to the present disclosure, said method comprising:
- A) applying the eradicator fluid according to the disclosure or contained in the kit according to the disclosure on the written mark in needs of being corrected until the written mark is made invisible for the naked eyes;
- B) rewriting once the porous substrate has dried, in particular after at least 1 min, with an aqueous writing ink composition containing metal nanoparticles as the coloring agent, said metal nanoparticles essentially consisting of metal and said metal being chosen from silver, gold, aluminum and/or copper, the aqueous writing ink composition being specifically contained in the kit according to the disclosure or as described above, on the erased spot on the porous substrate.

The present disclosure finally concerns a method of using the kit according to the disclosure comprising:
- A1) writing on a porous substrate with the aqueous writing ink composition (a);
- B1) if necessary, erasing or changing the color of part of the writing mark obtained in step A1) with the eradicator fluid (b) until the written mark is made invisible for the naked eyes or the color of the written mark is changed for the naked eyes;
- C1) if necessary, rewriting once the porous substrate has dried, in particular after at least 1 min, with the aqueous writing ink composition (a) on the erased spot of the porous substrate.

The disclosure will be better understood in reference to the example which is given in a non-limited way.

Example 1: Kit Containing an Ink Composition with Silver Nanoparticles Prepared by an Ex-Situ Process Preparation of an Aqueous Suspension of Silver Seed Nanoparticles (Step (i))

In a first step (i), an aqueous suspension of silver seed nanoparticles is prepared by mixing 20.59 g of distilled water, 0.00085 g of silver nitrate (9370.1 Cark Roth), 0.0013 g of trisodium citrate (S1804-500G Sigma Aldrich).

The mixture was homogenised with a homogenizer mixer at a speed of 400 rpm during 1 minute. Then, 0.000227 g of sodium borohydride $NaBH_4$ (71321-25G Fluka Analytical) were added dropwise. The yellow solution obtained was then stored in the dark and aged for 2 hours.

Preparation of an Aqueous Suspension of Silver Nanoparticles with a Fixed Color (Step (ii))

In a second step (ii), an aqueous suspension of silver nanoparticles with a fixed colour is prepared by mixing 528.59 g of distilled water, 1.25 g of polyvinylpyrrolidone (PVP40-100G Sigma Aldrich), 5 mL of the seed solution obtained in step (i), 0.097 g of trisodium citrate (S1804-500G Sigma Aldrich), 0.044 g of ascorbic acid (A92902-100G Sigma Aldrich).

The mixture was homogenised with a homogenizer mixer at a speed of 400 rpm during 1 minute.

Then, 0.021 g of $AgNO_3$ were slowly added to the mixture with a homogenizer mixer at a speed of 400 rpm. The color of the solution changes from colorless to yellow, red and finally green.

Concentration step of the metal nanoparticles by centrifugation (step (iii):

One minute after the last addition of $AgNO_3$, the aqueous suspension of silver nanoparticles was centrifuged at 10000 rpm for 30 minutes.

During this concentration step, the aqueous suspension of silver nanoparticles has been decanted and the final volume obtained after this centrifugation was 5 mL.

This final volume after centrifugation step comprises 0.014 g of Ag nanoparticles.

Besides, the shape of the Ag nanoparticles is mainly polyhedral with an average particle size comprising between 50-70 nanometers, measured by analysis of 2D images (microscope: JEOL ARM 200), according to the standard ISO9001:2015.

Preparation of the Aqueous Gel Ink with Fixed Color (a)

An aqueous gel ink was prepared by mixing 0.53 g of glycerin (co-solvent), 0.42 g of polyethylene glycol (co-solvent), 0.01 g of Acticide® MBS (antimicrobial agent), and 0.02 g of Additin® RC8221 (corrosion inhibitor). The mixture was homogenised with a homogenizer mixer at a speed of 15 $m \cdot s^{-1}$ during 15 minutes and heated at a temperature of 35° C. Then, 0.02 g of xanthan gum (rheology modifier) was added to the mixture. The mixture was homogenized with a homogenizing mixer at a speed of 15 $m \cdot s^{-1}$ during 15 minutes at a temperature of 35° C. 4.27 g of the green aqueous suspension of nanoparticles obtained in step (iii) above was slowly added to the mixture. The mixture was left to stand for 2 h 30. Then, 0.015 g of Moussex® S 9092 (antifoam agent) was added. The mixture was homogenized with a homogenizing mixer at a speed of 15 $m \cdot s^{-1}$ during 30 minutes at a temperature of 35° C.

The aqueous gel ink obtained was cooled at room temperature (25° C.).

The aqueous gel ink is green. The total amount of aqueous gel ink is of 5.28 g, wherein the aqueous gel ink comprises 0.22% by weight of Ag nanoparticles.

Besides, the shape of the Ag nanoparticles is mainly polyhedral with an average particle size comprising 50-70 nanometers, measured by analysis of 2D images (microscope: JEOL ARM 200), according to the standard ISO9001:2015.

Preparation of the Eradicator Fluid (b)

Three different eradicator fluids are envisaged:
An aqueous solution hydrogen peroxide at 30% (w/w) was prepared as an eradicator fluid (b1).
A sodium bicarbonate solution at 1M was prepared as an eradicator fluid (b2).
A mixture of 80% of an aqueous solution of hydrogen peroxide at 30% (w/w) with 20% of ethanol was prepared as an eradicator fluid (b3).

Erasing Process of the Ink

When the obtained aqueous ink composition (a) was written on a porous substrate (calligraph notebook: Calligraphe LIGNE 7000, 70 g·m$^{-2}$, 210×297 mm, 80 pages, by Clairefontaine), the color did not change and remained green. The written mark was erased with an eradicator fluid (b1 or b2 or b3), just after writing, to erase the color of the written mark.

Then, it was possible to re-write after the erasing (around 10 min after by using eradicator fluids b1 or b2, and around after 1 min by using eradicator fluid b3) by using the same aqueous ink composition (a).

The invention claimed is:

1. A kit comprising
   a) an aqueous writing ink composition containing:
      metal nanoparticles as coloring agent, wherein said metal nanoparticles essentially consists of metal and said metal is chosen from silver, gold, aluminum and/or copper, and
      a dispersing agent, and
   b) an eradicator fluid containing at least one oxidizing agent.

2. The kit according to claim 1, wherein the ink composition (a) and the eradicator fluid (b) are contained in two different writing instruments, or the ink composition (a) and the eradicator fluid (b) are contained in the same writing instrument.

3. The kit according to claim 1, wherein the metal of the metal nanoparticles comprises at least silver, gold and mixture thereof.

4. The kit according to claim 1, wherein the aqueous writing ink composition (a) exhibits a plasmonic effect.

5. The kit according to claim 1, wherein the total amount of metal nanoparticles of the aqueous writing ink composition (a) ranges from 0.01 to 10% by weight, relative to the total weight of the aqueous writing ink composition (a) and/or wherein the metal nanoparticles of the aqueous writing ink composition (a) have an average particle size ranging from 1 to 200 nm.

6. The kit according to claim 1, wherein the dispersing agent is chosen from homopolymers or copolymers of vinylpyrrolidone and/or homopolymers or copolymers of vinyl alcohol, and mixtures thereof, and/or wherein the amount of dispersing agent is ranging from 0.01 to 10 weight %, based on the total weight of the aqueous writing ink.

7. The kit according to claim 1, wherein the aqueous writing ink composition (a) further contains:
   a reducing agent chosen from alkali metal salt or alkaline earth metal salt, and/or hydroxylamine (NH$_2$OH) and/or ascorbic acid and/or oxalic acid and/or formic acid and/or formaldehyde and/or hydrazine and/or substituted hydrazine e.g. 1,1-dimethylhydrazine or 1,2-dimethylhydrazine and/or sodium hydrosulfite and/or tributylstannane and/or tributyltin hydride and/or triphenyl-phosphine and/or triphenylphosphite and/or trichlorosilane and/or triethylsilane, tris(trimethylsilyl)silane and/or polymethylhydroxylisane and/or ester of retinol of formula (I):

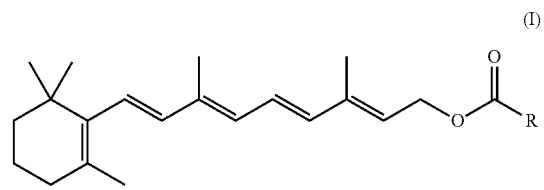

wherein R is an optionally substituted $C_1$-$C_6$ aliphatic group, and/or citric acid and/or derivatives of citric acid chosen from esters, amides and thioesters of citric acid, salts of citric acid or of said derivatives, solvates of citric acid or of said derivatives, and mixture thereof and/or an N-Acyl-aminophenol, and/or
   alkali metal hydride, specifically sodium borohydride NaBH$_4$.

8. The kit according to claim 1, wherein the aqueous writing ink composition (a) further contains a co-solvent, an antimicrobial agent, a corrosion inhibitor, an antifoam agent, and/or a rheology modifier.

9. The kit according to claim 1, wherein the oxidizing agent of the eradicator fluid (b) is chosen in the group consisting of oxygen, hydrogen peroxide $H_2O_2$ and compounds capable of producing hydrogen peroxide by hydrolysis such as nitric acid, organic peroxide, urea peroxide, alkali metal bromates and persalts, halogen, oxide and mixtures thereof, and/or wherein the eradicator fluid (b) further comprises a volatile solvent.

10. An aqueous writing ink composition containing:
    metal nanoparticles as coloring agent, wherein said metal nanoparticles essentially consists of metal and said metal is chosen from silver, gold, aluminum and/or copper, and
    a dispersing agent, and
    a reducing agent comprising ascorbic acid.

11. The aqueous writing ink according to claim 10, wherein the metal nanoparticles are the only coloring agent.

12. The aqueous writing ink according to claim 10, wherein the metal of the metal nanoparticles comprises at least silver, gold and mixture thereof.

13. The aqueous writing ink according to claim 10, wherein the dispersing agent is a homopolymer or copolymer of vinylpyrrolidone and/or homopolymer or copolymer of vinyl alcohol, and mixtures thereof.

14. The aqueous writing ink according to claim 10, wherein the reducing agent further comprises:
    an alkali metal salt or alkaline earth metal salt, and/or hydroxylamine (NH$_2$OH) and/or oxalic acid and/or formic acid and/or formaldehyde and/or hydrazine and/or substituted hydrazine and/or sodium hydrosulfite and/or tributylstannane and/or tributyltin hydride and/or triphenyl-phosphine and/or triphenylphosphite and/or trichlorosilane and/or triethylsilane, tris(trimethylsilyl)silane and/or polymethylhydroxylisane and/or ester of retinol of formula (I):

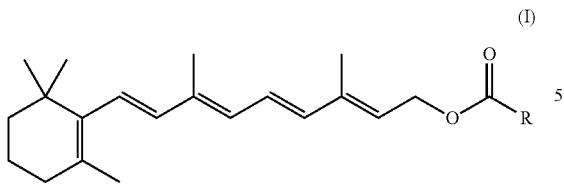
(I)

wherein R is an optionally substituted $C_1$-$C_6$ aliphatic group,
and/or citric acid and/or derivatives of citric acid chosen from esters, amides and thioesters of citric acid, salts of citric acid or of said derivatives, solvates of citric acid or of said derivatives, and mixture thereof and/or an N-Acyl-aminophenol, and/or
alkali metal hydride.

15. The aqueous writing ink according to claim 10, wherein the reducing agent further comprises:
an alkali metal salt and/or alkaline earth metal salt of citrate and/or of chloride and/or carbonate, and/or
alkali metal hydride.

16. The aqueous writing ink according to claim 10, wherein the reducing agent further comprises sodium citrate and sodium borohydride $NaBH_4$.

17. A method for preparing an aqueous suspension comprising metal nanoparticles, wherein the metal nanoparticles are prepared by mixing metal salts with a mixture of:
alkali metal or alkaline earth metal salt of citrate,
an alkali metal hydride, and
ascorbic acid,
and in presence of a dispersing agent.

18. The method according to claim 17, wherein the metal of the metal nanoparticles comprises at least silver, gold and mixture.

19. The method according to claim 17, wherein the dispersing agent is a homopolymer or copolymer of vinylpyrrolidone and/or homopolymer or copolymer of vinyl alcohol.

20. The method according to claim 17 comprising:
a step (i) of preparing an aqueous suspension of the seeds of the metal nanoparticles, carried out by mixing a metal salt with water and a mixture of alkali metal or alkaline earth metal salt of citrate, and an alkali metal hydride;
a step (ii) carried out by mixing the aqueous suspension obtained in step (i) with:
a dispersing agent;
a mixture of alkali metal or alkaline earth metal salt of citrate, and ascorbic acid, and
a metal salt from the same metal than the metal salt used in step i);
optionally a step (iii) of concentrating the metal nanoparticles.

* * * * *

UNITED STATES PATENT AND TRADEMARK OFFICE
CERTIFICATE OF CORRECTION

| | | |
|---|---|---|
| PATENT NO. | : 12,116,493 B2 | Page 1 of 1 |
| APPLICATION NO. | : 18/547656 | |
| DATED | : October 15, 2024 | |
| INVENTOR(S) | : Karine Mougin et al. | |

It is certified that error appears in the above-identified patent and that said Letters Patent is hereby corrected as shown below:

In the Claims

In Claim 7, Column 20, Lines 27-28, delete ", specifically sodium borohydride NaBH4".

Signed and Sealed this
Tenth Day of December, 2024

Katherine Kelly Vidal
*Director of the United States Patent and Trademark Office*